United States Patent [19]
Holand, Sr.

[11] 3,744,585
[45] July 10, 1973

[54] VEHICLE HAVING AXIAL SUPPORTING WHEELS ENGAGEABLE WITH LOAD BEARING DRIVING ROLLERS

[75] Inventor: John G. Holand, Sr., Houston, Tex.

[73] Assignee: Rolligan Corporation, Houston, Tex.

[22] Filed: June 1, 1971

[21] Appl. No.: 148,585

[52] U.S. Cl. .............. 180/74, 152/9, 152/209, 280/DIG. 7
[51] Int. Cl. ............................................. B60k 9/00
[58] Field of Search ................. 180/74; 280/DIG. 7; 152/209

[56] References Cited
UNITED STATES PATENTS

| | | | |
|---|---|---|---|
| 2,990,026 | 6/1961 | Albee | 180/74 |
| 2,861,643 | 11/1958 | Wald et al. | 180/74 |
| 3,180,305 | 4/1965 | Gower-Rempel | 305/34 |
| 3,023,826 | 3/1962 | Larson et al. | 180/74 X |

Primary Examiner—Robert G. Sheridan
Assistant Examiner—Jerold M. Forsberg
Attorney—James F. Weiler, Jefferson D. Giller, William A. Stout, Paul L. Deverter, Dudley R. Dobie, Jr. and Henry W. Hope

[57] ABSTRACT

A vehicle having elongated, flexible-walled wheels carrying a load on their axles and having one or more load supporting rollers engageable with the outer periphery of the wheel. The vehicle being axially driven and/or roller driven. The rollers being movable relative to the wheels into and out of contact with the wheel. The wheels including a plurality of cleats for providing a gripping relationship with the ground and the outer periphery also including at least one portion free of cleats extending circumferentially around the wheel for engaging one or more supporting and/or driving rollers. The smooth portion on the wheel including a plurality of continously circumferentially wrapped layers of material whose outer edges decrease inwardly to the wheel.

25 Claims, 7 Drawing Figures

PATENTED JUL 10 1973

John G. Holland, Sr.
INVENTOR.

BY James F. Weiler
William A. Stout
ATTORNEYS

John G. Holland, Sr.
INVENTOR.

BY

ATTORNEYS

John G. Holland, Sr.
INVENTOR.

BY James L. Wheeler
William A. Stout
ATTORNEYS 3,744,585

VEHICLE HAVING AXIAL SUPPORTING WHEELS ENGAGEABLE WITH LOAD BEARING DRIVING ROLLERS

BACKGROUND OF THE INVENTION

Vehicles having axially elongated, flexible-walled wheels which are peripherally loaded and driven such as shown in Reissue U.S. Pat. Nos. 24,272 and 2,990,026 have been used in the past. However, such roller driven vehicles, in certain environments, such as mud and swamps, fail to provide the necessary traction and drive requirements as slippage occurred between the roller and the wheel and also between the wheel and the ground. In addition, vehicles having an axially elongated, flexible-walled wheel have been used which are axially driven. While these latter vehicles have provided sufficient drive, their use has been limited to a small load carrying capacity.

The need has arisen for a load carrying vehicle for carrying heavy loads in off-the-road environment such as rough, uneven or rocky ground, or over soft or difficult terrain, such as sand, swamps, snow or mud, or upon water using an axially elongated, flexible-walled, fluid-distensible wheel. The present invention is directed to various improvements in an axially elongated, flexible-walled wheel having a high load capacity and-/or a high drive or pulling capacity.

SUMMARY

The present invention is directed to a vehicle having a plurality of axially elongated, flexible-walled ground contacting wheels with coaxial axle means supporting a load sustaining structure in which the outer periphery of the wheel includes at least one smooth circumferentially extending surface and one or more load sustaining rollers connected to the structure and engageable with the smooth portion of the wheel.

Still a further object of the present invention is the provision of means for moving the rollers relative to the wheels for moving the rollers into contact with the smooth portions of the wheel for supporting a part of the load from the upper portion of the wheel thereby carrying greater loads, and for moving the rollers out of contact with the wheel when the vehicle is carrying lighter loads.

Still a further object of the present invention is the provision of power drive means connected to either or both of the axle means and the rollers for powering the vehicle.

Yet a further object of the present invention is the provision of an axially elongated and flexible-walled wheel having a plurality of cleats thereon to provide traction with the ground and including one or more circumferentially extending smooth portions for providing a wearing surface, drive force surface and load bearing surface for contact by top rollers with the smooth portion constructed to provide a wheel that will withstand the forces imposed thereon to provide a long life.

Still a further object of the present invention is the provision of an axially elongated, flexible-walled ground contacting wheel having one or more radially outwardly extending circumferentially smooth wearing pad portions on the outer portion of the wheel which pad portion includes a plurality of continuously circumferentially wrapped layers of material with one or more rollers engageable with each smooth wearing pad which may be moved into and out of contact with the wheel for load carrying and powering as desired.

DESCRIPTION OF THE PREFERRED EMBODIMENT

Figure 1:
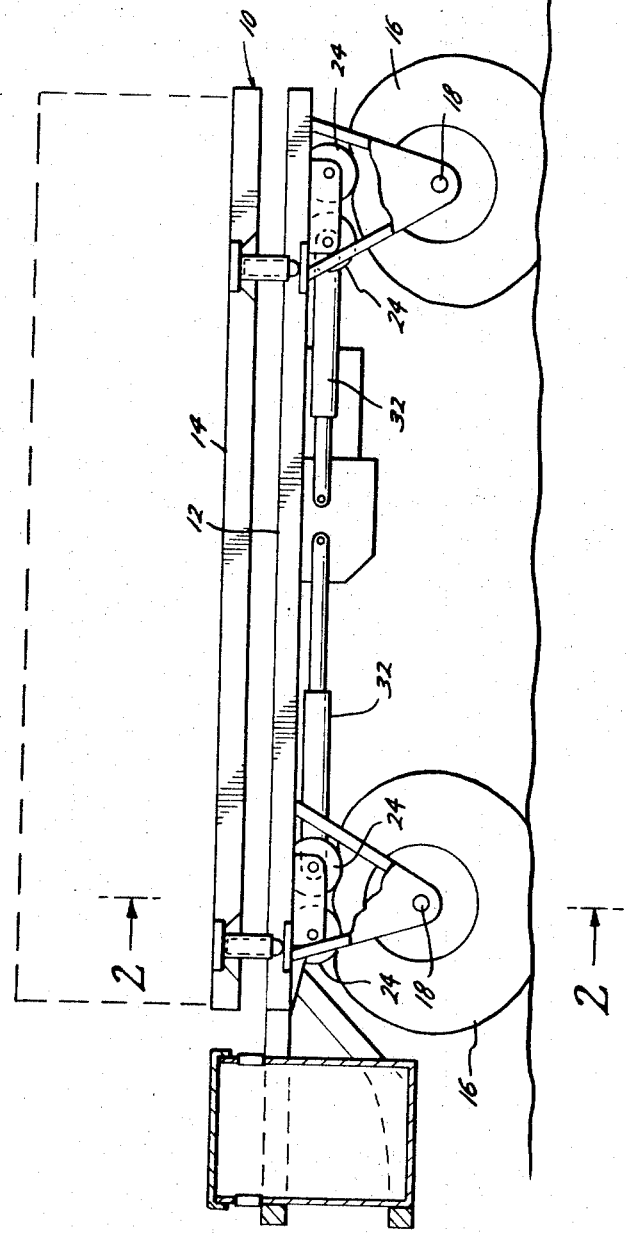
FIG. 1 is an elevational view, partly schematic, illustrating a vehicle according to the present invention.

Referring now to the drawings, particularly to FIG. 1, the reference numeral 10 generally indicates a vehicle of the present invention which generally includes a load sustaining structure 12 for supporting any suitable load and a plurality of wheels 16, here shown for convenience only as being four.

The wheels 16 are axially elongated, flexible-walled, fluid-distensible wheels such as air bags generally disclosed in Reissue U.S. Pat. No. 24,272. Wheels 16 have suitable coaxially axle means 18 such as means which may project from each end of the wheels 16 for connection to and supporting the load structure 12. Suitable drive means including differential 20 are connected to the axles 18 for axially driving the wheels 16 and thus the vehicle 10. Of course, the drive means may be omitted, for example if the vehicle 10 is a trailer. In order to provide sufficient drive traction and a gripping relationship of the wheels 16 with the ground, a plurality of cleats 22 are provided about the outer periphery of the wheels 16 extending in size and spacing sufficient to give good traction depending on such factors as load and environment. However, the amount of axial loads which can be carried by the wheels 16 is limited as under heavy loads the tires 16 will tend to belly upward and make injurious contact with the load structure 12. Therefore, one or more top rollers 24 are provided connected to the load supporting structure 12 so as to be engageable with the wheels 16 and which function as overload and/or powered rollers as desired to increase the loading capacity and/or the drive capacity of the vehicle 10. In order that the cleats 22 do not interfere with the rollers 24, the outer periphery of the wheel 16 includes one or more circumferentially smooth, portions 26, which may include a pad as more fully described hereinafter, aligned with each of the rollers 24 which provide a surface of contact. Suitable means, either vertically moving or horizontally moving, such as the horizontally moving cylinder and piston assemblies 32, may be provided for moving the rollers 24 into and out of contact with the cleat free portions 26 of the wheels 16.

Of course, any desired number of rollers 24 may be positioned for engagement with each of the cleat free smooth portions 26 and for convenience only, as best seen in FIG. 1, two rollers 24 are shown for engagement with each of the cleat free smooth portions 26. As shown in FIG. 1, the hydraulic piston and cylinder assemblies 32 may be actuated by suitable controls (not shown) for moving one or all of the rollers 24 into engagement with the wheels 16. As shown in FIG. 1, for purposes of illustration only, all of the rollers 24 are in engagement with the first set of wheels 16, but only one of the rollers is in engagement with the second set of wheels 16. Of course, all of the rollers 24 can be actuated to be moved into total engagement with the wheels 16 or completely retracted out of engagement if desired. The number of rollers 24 which are placed in engagement with the wheels 16 depends upon the load carried by the vehicle. The greater the load, the more of the rollers 24 would be placed in contact for either load supporting and/or drive. And, of course, if the load was sufficiently light, all of the rollers 24 would be removed from contact with the wheels 16 and the load would be supported entirely from the axles 18 as the rollers 24 would not be needed and it would be desirable to retract them for reducing unnecessary friction and wear.

In addition, suitable drive means are connected from a drive transmission 42 to each of the rollers 24 for powering the rollers against the smooth portions 26 to provide drive solely by the rollers 24 or as additional drive for the vehicle 10.

It is noted that the cleat free portions 26 and the rollers 24, when used with a wheel having cleats 22, are of a small axial length as compared to the axial length to the wheels 16 so as not to adversely reduce the periphery surface of the wheel 16 containing the cleats 22, but yet provide a structure to supplement the load carrying capacity and/or drive capacity of the axial drive system of the wheels 16. However, in some uses the cleats 22 may be entirely omitted and the portions 26 and rollers 24 may be of greater axial extent. For example in snow, mud, slime, and water, a cleated wheel is more suitable and the cleated portions should be of greater axial width. However, on sand, hard ground, and rocks, a wheel with less cleat area is more suitable.

Figure 2:
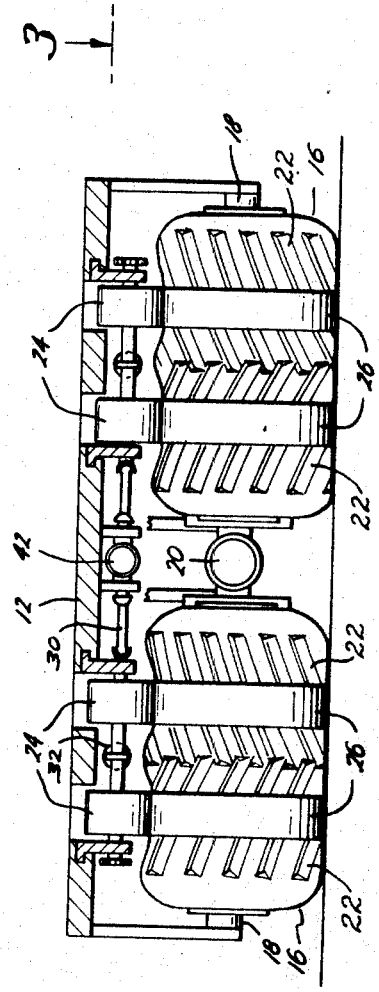
FIG. 2 is a cross-sectional view taken along the line 2—2 of FIG. 1.
Figure 3:
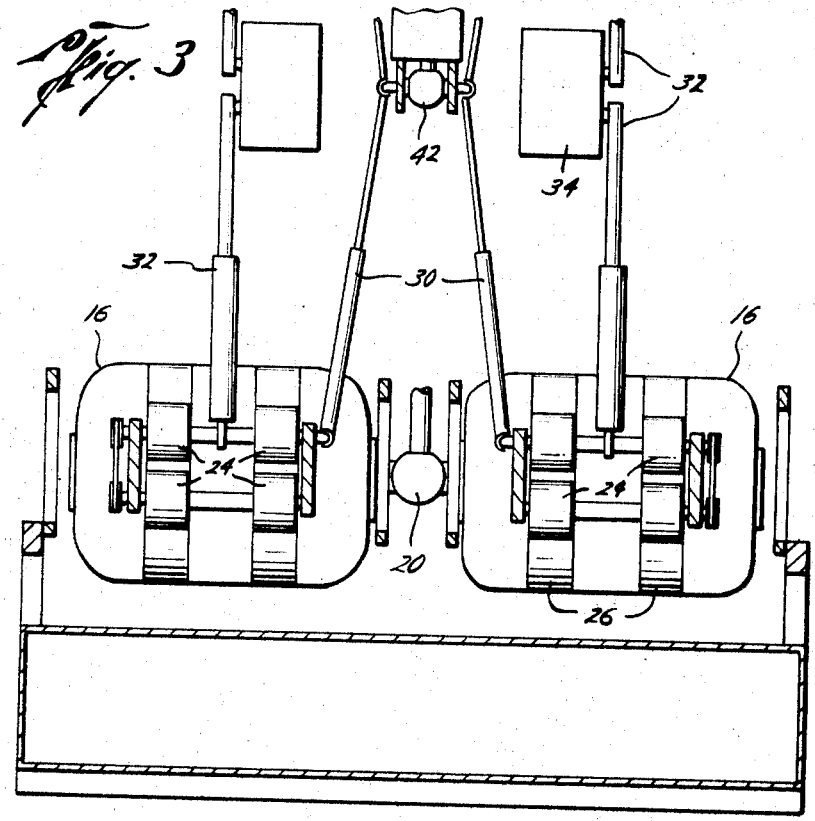
FIG. 3 is a cross-sectional view taken along the line 3—3 of FIG. 2.
Figure 4:
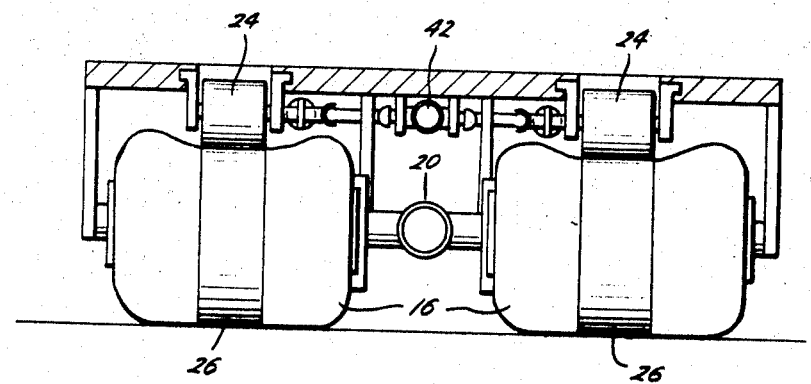
FIG. 4 is an end elevational view of another embodiment of the present invention.

While the embodiment of FIGS. 1-3 having a plurality of pads 26 and a plurality of rollers 24 in contact with each pad is desired for maximum load carrying and drive capacity, the embodiment of FIG. 4 having only one smooth portion 26 for each wheel 16 and one roller 24 for each portion 26 may be used for lighter capacity vehicles 10.

Figure 5:
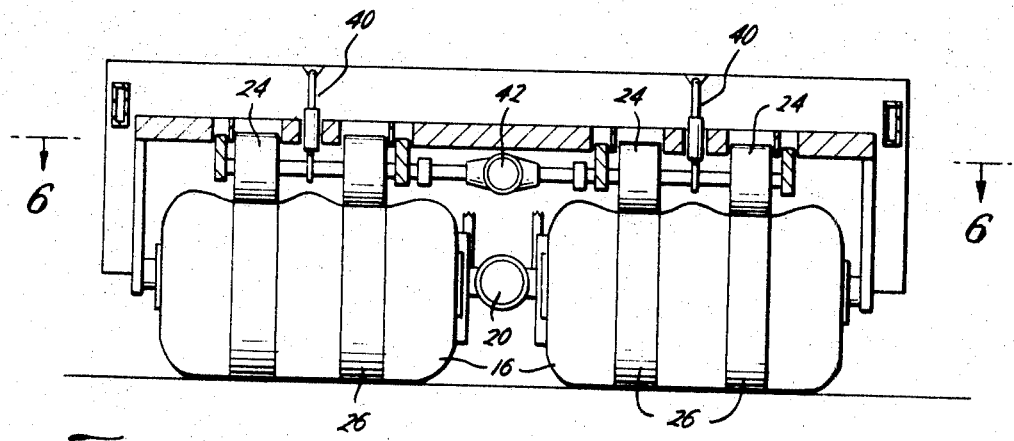
FIG. 5 is an elevational view, partly schematic, illustrating another embodiment of the present invention.
Figure 6:
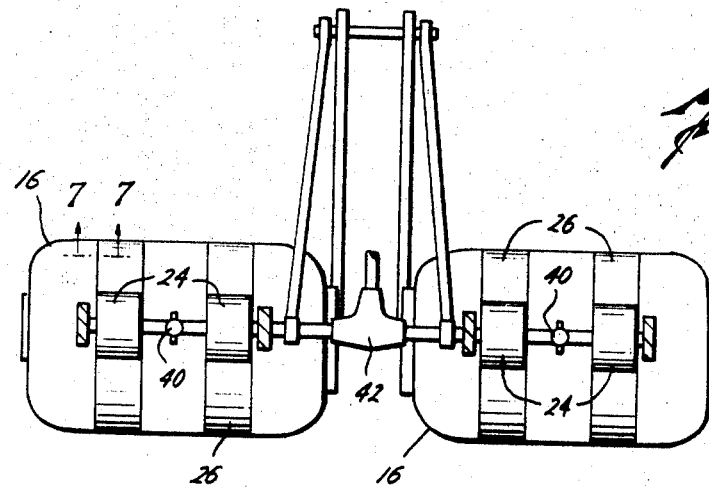
FIG. 6 is a cross-sectional view taken along line 6—6 of FIG. 5.

Referring now to FIGS. 5 and 6, another embodiment of the present invention is shown. This embodiment is similar to the embodiments of FIGS. 1-4 with the exception that the rollers 24 may be moved vertically into and out of contact with the wheels 16, such as by means of hydraulic rams 40 which raise and lower the rollers 24, and their drive differential 42. This embodiment of vertically moving the rollers 24 has the advantage that the amount of load desired to be carried by the rollers can be easily adjusted by the distance the rollers 24 are moved toward and against the wheels 16.

Figure 7:
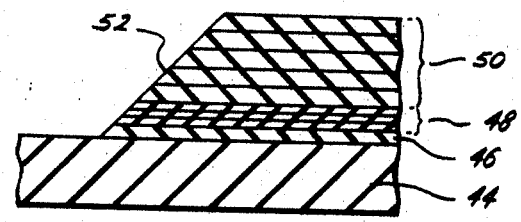
FIG. 7 is an enlarged fragmentary cross-sectional view illustrating the construction of the wheel of the present invention.

Preferably, the smooth portions 26 of the wheels 16 are built up or extend from the surface of the wheels 16 to form pads which can periodically be replaced as required. Referring now to FIG. 7, a fragmentary cross-sectional view of one example only of a pad of the smooth portion 26 of the wheel 16 is best seen. Generally, the roller 24 causes excessive wear at the contact edges of both the roller 24 and the wheel 16 and the roller 24 and wheel 16 surfaces may be soon worn beyond use. The use of a pad in the smooth portions 26 furnishes a wearing surface, a drive force surface, and a load bearing surface and avoids the possibility of wearing out the usual smooth tire in a short service period. For example only, the pad 26, which is bonded to the carcass 44 of the wheel 16 may include a first layer 46 of 0.080 inch liner stock, three layers 48 of 0.044 rayon cord stock wrapped circumferentially and five layers 50 of 0.125 tread stock wrapped continuously and circumferentially around, to provide a height of approximately 1 inch, and extend outwardly approximately the same amount as the cleats 22. Both the pad 26 and the cleats 22 may be replaced when worn by retreading to the carcass 44. Of course, the exact construction, size, and type of pad would be determined by the use, the load and the environment in which the vehicle is used.

The pad 26 construction described advantageously limits the crinkling and loosening of the pad 26 from the carcass 44 of the wheel 16 under use. That is, the continuous circumferentially wrapping of the multiple layers 48 and 50, properly tensed, holds the pad 26 in place and to the carcass 44 of the wheel 16 and keeps the rubber in the carcass from stretching and tearing the pad from the carcass by the forces exerted by the rollers 24. Preferably, the pad 26 inclues a transition portion 52 of decreasing thickness at each outer edge both to provide a greater bonding surface and flexibility relative to the outer edges of the pads 26 relative to the carcass 44 and to provide a wider pad 26 surface than the width of the contacting rollers 24. Such transition portion may be of any suitable contour such as quarter-round, skew, ogee or tapered as shown. Pads 26 and cleats 22 are more effective if tapered to the outer periphery of the wheel.

In use, the vehicle 10 may be powered through the differential 20 to provide an axial drive whereby the cleats 22 will provide traction under varying types of ground conditions. However, in the event that increased load capacity or drive performance is desired, one or more of the rollers 24 may be moved into engagement with the upper portion of the wheels 16 on the pads 26. The rollers 24 may function as either overload rollers to support a portion of the load bearing structure 12 from the wheels 16, or in addition, may be driven through drive means 42 to provide drive solely by the rollers 24 or as additional drive power for the vehicle. Of course, if the rollers 24 are not needed, they are retracted away from the wheels to avoid unnecessary wear. And the vertical moving rollers of FIGS. 5 and 6, in particular, can be variably adjusted so that the amount of load carried by the rollers 24 can be easily adjusted. And, of course, the present invention may be used on a trailer vehicle by omitting the drive means.

The present invention, therefore, is well adapted to carry out the objects and attain the ends and advantages mentioned as well as others inherent therein.

What is claimed is:

1. A vehicle comprising,
a plurality of axially elongated, flexible-walled, fluid-distensible ground contacting wheels, each wheel including coaxial axle means,
a load sustaining structure connected to and supported from the axle means,
each said wheel outer periphery including at least one smooth pad portion extending radially outward from the periphery of said wheels and circumferentially extending about the wheel, said axial extent of said pad being less than the axial extent of said wheel, and at least one load sustaining roller connected to the structure and engageable with said smooth pad portion of each wheel, and the axial extent of the pad being at least as great as the axial extent of the roller for preventing the roller from contacting the wheel, and the surface of the pad at the line of contact between the pad and the roller remaining substantially parallel to the axle means for reducing the difference of relative peripheral velocities between the pad and the roller.

2. The apparatus of claim 1 including,
power means connected to the axle for axially driving said wheels.

3. The invention of claim 2 including,
power means connected to said roller for providing additional drive power for the vehicle.

4. The apparatus of claim 1 including,
power means connected to said roller for driving said vehicle.

5. The apparatus of claim 1 wherein said smooth outer periphery pad portion of said wheel includes,
a plurality of continuously circumferentially wrapped layers of material.

6. The apparatus of claim 1 including,
means for moving said roller relative to said wheel to move the roller into and out of contact with the smooth pad of the wheel.

7. The apparatus of claim 4 wherein the pad portion includes a transition portion decreasing inwardly at its outer edges to the wheel.

8. A vehicle comprising,
a plurality of axially elongated, flexible-walled, fluid-distensible ground contacting wheels, each wheel including coaxial axle means,
a load sustaining structure connected to and supported from the axle means,
said wheels outer periphery including a plurality of cleats extending outwardly for providing a gripping relationship with the ground,
at least one portion of the outer periphery of said wheels being free of said cleats and including a smooth pad portion extending radially outward from the periphery of said wheels and extending circumferentially about said wheel for providing a continuous substantially smooth circumferential pad portion, said axial extent of said pad being less than the axial extent of said wheel,
at least one load sustaining roller connected to said structure and engageable with each of the circumferential smooth pad portions of said wheels, the axial extent of the pad being at least as great as the axial extent of the roller for preventing the roller from contacting the wheel,
the surface of the pad at the line of contact between the pad and the roller remaining substantially parallel to the axle means for reducing the difference of relative peripheral velocities between the pad and the roller,
power means connected to the axle means for axially driving said wheels.

9. The apparatus of claim 8 including,
power means connected to the rollers for additional driving the wheels with the rollers.

10. The apparatus of claim 8 wherein,
the pad extending radially outward from the outer periphery of said wheels including a plurality of continuous circumferentially wrapped layers of material.

11. The apparatus of claim 10 wherein said pad portion includes a transition portion decreasing inwardly at the outer edges to the wheel.

12. The apparatus of claim 8 including,
a plurality of said cleat free circumferential smooth pad portions separated from each other, and
at least one roller engageable with each said smooth portion.

13. The apparatus of claim 8 including,
more than one roller engageable with each said smooth pad portion.

14. A vehicle comprising,
a plurality of axially elongated, flexible-walled, fluid-distensible ground contacting wheels, each wheel including coaxial axle means,
a load sustaining structure connected to and supported from the axle means,
said wheels outer periphery including a plurality of smooth pad portions separated from each other and extending radially outward from the periphery of the wheel and circumferentially about the wheel, the axial extent of each said pad being less than the axial extent of said wheel, the axial extent of the pad being at least as great as the axial extent of the roller for preventing the roller from contacting the wheel,
at least one load sustaining roller connected to the structure and engageable with each smooth pad portion, and
the surface of the pad at the line of contact between the pad and the roller remaining substantially parallel to the axle means for reducing the difference of relative peripheral velocities between the pad and the roller.

15. The apparatus of claim 14 including,
more than one roller engaging each of said smooth pad portions.

16. The apparatus of claim 14 including,
means for moving said rollers relative to said wheels to move the rollers into and out of contact with the smooth pads of the wheels.

17. The apparatus of claim 14 wherein said smooth outer periphery pad portions of said wheels includes,
a plurality of continuously circumferentially wrapped layers of material.

18. The apparatus of claim 14 including,
power means connected to said rollers for providing drive power for the vehicle.

19. The apparatus of claim 14, including,
power means connected to the axle means for axially driving said wheels.

20. The apparatus of claim 18 including,
power means connected to the axle means for axially driving said wheels.

21. A vehicle comprising,
a plurality of axially elongated, flexible-walled, fluid-distensible ground contacting wheels, each wheel including coaxial axle means,
a load sustaining structure connected to and supported from the axle means, said wheels outer periphery including a plurality of cleats extending outwardly for providing a gripping relationship with the ground, said wheels outer periphery including a plurality of smooth pad portions being free of said cleats separated from each other and extending radially outward from the periphery of the wheel said axial extent of said pads being less than the axial extent of said wheel, and circumferentially about the wheel, at least one load sustaining roller connected to the structure and engageable with each smooth pad portion, the axial extent of the pad being at least as great as the axial extent of the roller for preventing the roller from contacting the wheel, and the surface of the pad at the line of contact between the pad and the roller remaining substantially parallel to the axle means for reducing the difference of relative peripheral velocities between the pad and the roller.

22. The apparatus of claim 21 including,
power means connected to the axle means for axially driving said wheels.

23. The apparatus of claim 21 including,
power means connected to said rollers for providing drive power for the vehicle.

24. The apparatus of claim 22 including,
power means connected to said roller for providing drive power for the vehicle.

25. The apparatus of claim 21 including,
more than one roller engageable with each smooth pad portion.

* * * * *